United States Patent [19]

Seepe et al.

[11] Patent Number: 4,665,319

[45] Date of Patent: May 12, 1987

[54] SELF-PROPELLED TRACTION VEHICLE WITH LOW FUEL CONSUMPTION WHILE IDLING

[75] Inventors: John E. Seepe; Glenn E. Vest, both of Erie, Pa.

[73] Assignee: General Electric Company, Erie, Pa.

[21] Appl. No.: 714,603

[22] Filed: Mar. 21, 1985

[51] Int. Cl.$^4$ ............................................. B61D 27/00
[52] U.S. Cl. ......................................... 290/3; 290/1 B
[58] Field of Search ................................... 290/3, 1 B

[56] References Cited

U.S. PATENT DOCUMENTS

4,325,330 4/1982 Kugler et al. ........................... 62/243
4,413,595 4/1983 Potts, Jr. ........................ 123/142.5 R

*Primary Examiner*—Bernard Roskoski
*Attorney, Agent, or Firm*—Albert S. Richardson, Jr.

[57] ABSTRACT

In a diesel-electric locomotive, the power demand of electrically driven auxiliary equipment is automatically increased in response to the temperature of the diesel engine falling to an undesirably low level so as to load the engine when idling and thereby cause it to produce extra heat which prevents abnormal wear and excessive fuel consumption.

12 Claims, 9 Drawing Figures

SELF-PROPELLED TRACTION VEHICLE WITH LOW FUEL CONSUMPTION WHILE IDLING

BACKGROUND OF THE INVENTION

This invention relates generally to traction vehicles such as locomotives that have thermal prime movers on board, and it relates more particularly to fuel saving means for protecting the prime mover from abnormal wear when idling.

Large self-propelled traction vehicles such as locomotives commonly use a thermal prime mover to drive an electrical transmission comprising generating means for supplying electric current to a plurality of direct current (d-c) traction motors whose rotors are drivingly coupled through speed-reducing gearing to the respective axle-wheel sets of the vehicle. The generating means typically comprises a main 3-phase traction alternator whose rotor is mechanically coupled to the output shaft of the prime mover (typically a 16-cylinder turbocharged diesel engine). When excitation current is supplied to field windings on the rotating rotor, alternating voltages are generated in the 3-phase stator windings of the alternator. These voltages are rectified and applied to the armature windings of the traction motors.

During the "motoring" or propulsion mode of operation, a locomotive diesel engine tends to deliver constant power, depending on throttle setting and ambient conditions, regardless of locomotive speed. For maximum performance, the electrical power output of the traction alternator must be suitably controlled so that the locomotive utilizes full engine power. For proper train handling, intermediate power output levels are provided to permit graduation from minimum to full output. But the load on the engine must not exceed whatever level of power the engine can develop. Overloads can cause premature wear, engine stalling or "bogging," or other undesirable effects. Historically, locomotive control systems have been designed so that the operator can select the desired level of traction power, in discrete steps between zero and maximum, and so that the engine develops, whatever level of power the traction and auxiliary loads demand.

Engine horsepower is proportional to the product of the angular velocity at which the crankshaft turns and the torque opposing such motion. For the purpose of varying and regulating the amount of available power, it is common practice to equip a locomotive engine with a speed regulating governor which adjusts the quantity of pressurized diesel fuel (i.e., fuel oil) injected into each of the engine cylinders so that the actual speed (RPM) of the crankshaft corresponds to a desired speed. The desired speed is set, within permissible limits, by a manually operated lever or handle of a throttle that can be selectively moved in eight steps or "notches" between a low power position (N1) and a maximum power position (N8). The throttle handle is part of the control console located in the operator's cab of the locomotive. (In addition to the eight conventional power notches, the handle has an "idle" position and a "shutdown" position).

The position of the throttle handle determines the engine speed setting of the associated governor. In a typical governor system, the output piston of an electrohydraulic device is drivingly connected, via a mechanical linkage, to a pair of movable fuel pump racks which in turn are coupled to a plurality of fuel injection pumps that respectively meter the amounts of fuel supplied to the power cylinders of the engine. The governor compares the desired speed (as commanded by the throttle) with the actual speed of the engine, and its output piston moves the fuel racks as necessary to minimize any deviation therebetween.

For each of its eight different speed settings, the engine is capable of developing a corresponding constant amount of horsepower (assuming maximum output torque). When the throttle notch 8 is selected, maximum speed (e.g., 1,050 rpm) and maximum rated gross horsepower (e.g., 4,000) are realized. Under normal conditions the engine power at each notch equals the power demanded by the electric propulsion system which is supplied by the engine-driven main alternator plus power consumed by certain electrically and mechanically driven auxiliary equipments.

The output power (KVA) of the main alternator is proportional to the product of the rms magnitudes of generated voltage and load current. The voltage magnitude varies with the rotational speed of the engine, and it is also a function of the magnitude of excitation current in the alternator field windings. For the purpose of accurately controlling and regulating the amount of power supplied to the electric load circuit, it is common practice to adjust the field strength of the traction alternator to compensate for load changes and minimize the error between actual and desired KVA. The desired power depends on the specific speed setting of the engine. Such excitation control will establish a balanced steady-state condition which results in a substantially constant, optimum electrical power output for each position of the throttle handle.

In practice the above-summarized system of controlling a diesel-electric locomotive also includes suitable means for overriding normal operation of the system and reducing engine load in response to certain temporary abnormal conditions, such as loss of wheel adhesion, low pressure in the lubricating oil system or the engine coolant system, or a load exceeding the power capability of the engine at whatever speed the throttle is commanding. This response, which is generally referred to as "deration," helps the locomotive recover from such conditions and/or prevents serious damage to the engine. In addition, the excitation control system conventionally includes means for limiting or reducing alternator output voltage as necessary to keep the magnitude of this voltage and the magnitude of load current from respectively exceeding predetermined safe maximum levels or limits.

The above-summarized locomotive in practice will often be at rest with its engine running, its throttle in idle position, and its main alternator developing no power (i.e., zero traction load). The regular idle speed of a locomotive engine is usually high enough to enable all engine-driven auxiliary equipment to function properly if operative while the locomotive is at rest. More particularly, it is high enough to assure that the pressure in the engine cooling system (which includes an engine-driven water pump and a plurality of radiators) is sufficient to circulate the coolant through the radiators if required. A regular idle speed of approximately 450 rpm is typical.

To conserve fuel while the locomotive is at rest with the engine idling, it is a known practice to reduce engine speed below the aforesaid regular idle setting (e.g., to a preselected "low idle" speed such as 385 rpm) so long as the engine coolant is relatively warm. But if the temperature of the coolant were to drop below a predetermined low limit (e.g., approximately 160° F.), the engine is automatically returned to its regular idle speed, thereby producing more heat. Persons skilled in the art will understand that the operating temperature of a diesel engine needs to be above some minimum point for two different reasons: (1) engine fuel consumption, at any given idle speed, tends to vary inversely with temperature (increasing approximately 7% for each 10° F. decrement in a 16-cylinder, 4,000 horsepower engine); and (2) sulfur in the fuel tends to corrode the engine cylinder liners at an unacceptably rapid rate when the coolant temperature is too low. Corrosive liner wear can be controlled by running the engine at a higher idle speed and/or by adding electric heaters so as to warm up the engine coolant. Since fuel consumption increases with engine speed, it is obviously desirable to minimize the time during which the engine has to idle at more than the low idle speed.

SUMMARY OF THE INVENTION

It is a general objective of the present invention to provide, for a self-propelled traction vehicle or the like, novel means effective when the prime mover of the vehicle is idling for keeping the prime mover warm enough to prevent excessive wear without an untoward increase in fuel consumption.

Another objective is the provision of improved means for automatically protecting a diesel engine from undesirably low temperature when idling.

In carrying out the invention in one form, a locomotive is provided with a conventional variable-speed thermal prime mover, a cooling system for supplying coolant to the prime mover, main and auxiliary electric power generating means mechanically driven by the prime mover, a plurality of traction motors supplied with electric current from the main generating means, an auxiliary load comprising a plurality of variable-speed, motor-driven fans and blowers for supplying cooling air to the cooling system, the generating means and the traction motors, respectively, and means for selectively connecting the fan and blower driving motors for energization to the output of the auxiliary generating means. The locomotive also has a controller that provides a variable speed command signal for the prime mover and a variable excitation control signal for the main generating means, and the values of both signals are normally determined by an associated throttle which has an idle speed setting and multiple power settings. The prime mover is provided with speed control means responsive to the speed command signal for regulating its operating speed, and the main generating means is provided with excitation means responsive to the excitation control signal for regulating its power output. Means including the controller is provided for selecting and controlling the particular fan and blower motors to be energized as required for cooling the prime mover, the generating means, and the traction motors, respectively. Means is provided for sensing the temperature of the coolant in a section of the cooling system between the prime mover and the inlet of external radiators.

Idle override means is associated with the controller and connected to both the throttle and the temperature sensing means for causing the value of the prime mover speed command signal to vary as a predetermined function of the coolant temperature whenever the throttle is set for idle speed. More particularly, the value of the speed command signal is substantially lower than its regular idle value so long as the coolant is in a warm temperature range, but in response to the coolant temperature falling to a preset low level the idle override means is effective to increase this signal to a value that corresponds to a "high idle" speed appreciably greater than the regular idle speed of the prime mover. Now the prime mover produces more heat which warms up the coolant. To expedite this process and thereby minimize the time during which the prime mover idles at the "high idle" speed, auxiliary load increasing means is provided.

The auxiliary load increasing means is associated with the controller and connected to the temperature sensing means. It automatically increases the amount of electric power that the auxiliary generating means delivers to the fan and blower motors in response to the coolant temperature falling to the aforesaid low level. Preferably this is accomplished by commanding the traction motor blowers to run at full speed, regardless of the cooling needs of the traction motors. The increased auxiliary load causes the prime mover to do more work and thereby produce more heat. After the coolant temperature rises to a predetermined reset level that is approximately 4% higher than its preset low level, the auxiliary load increasing means permits the traction motor blowers to again be controlled as required for normal cooling purposes, and the idle override means returns the prime mover speed command signal to its low idle value. The combined low temperature responsive actions of the idle override means and the auxiliary load increasing means enable the low temperature level to be preset about 10° lower than in the prior art locomotive described above, thereby resulting in a significant fuel saving while the locomotive is at rest with its prime mover idling.

The invention will be better understood and its various objects and advantages will be more fully appreciated from the following description taken in conjunction with the accompanying drawings.

DESCRIPTION OF THE PREFERRED EMBODIMENT

Figure 1:
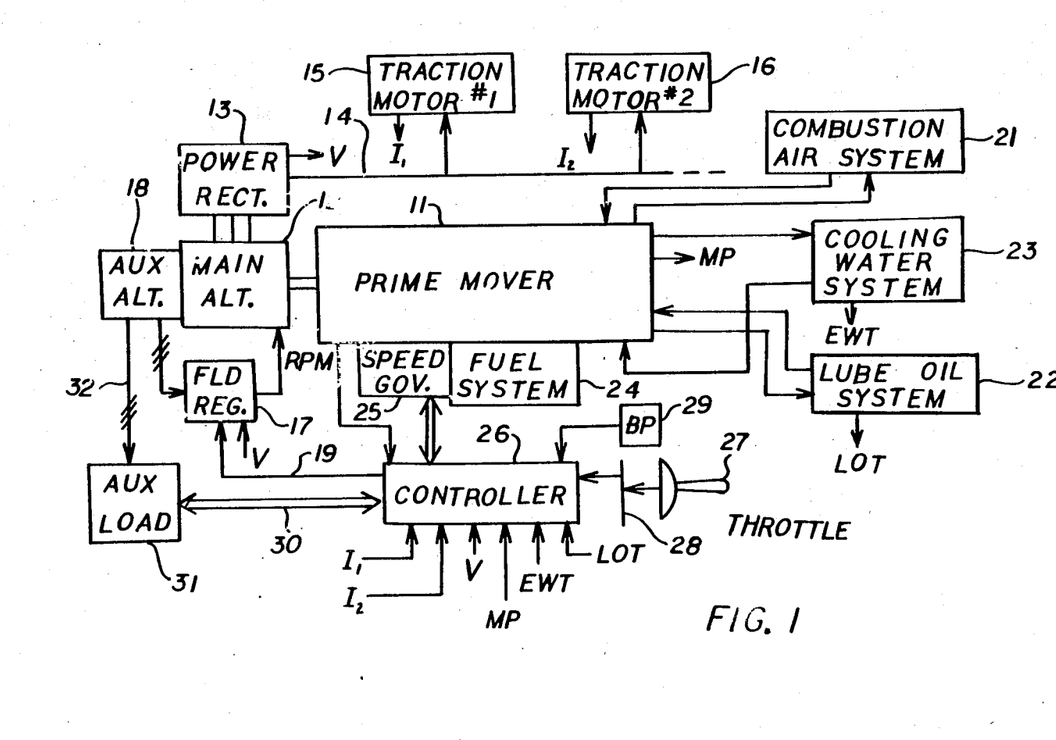
FIG. 1 is a schematic diagram of the principal components of a locomotive system, including a thermal prime mover (such as a diesel engine), a traction alternator, a plurality of traction motors, auxiliary load equipment, and a controller.

The propulsion system shown in FIG. 1 includes a variable-speed prime mover 11 mechanically coupled to the rotor of a dynamoelectric machine 12 comprising a 3-phase alternating current (a-c) synchronous generator, also referred to as the main traction alternator. The 3-phase voltages generated by the main alternator 12 are applied to a-c input terminals of at least one 3-phase, double-way uncontrolled power rectifier bridge 13. The rectified electric power output of the bridge 13 is supplied, via a d-c bus 14, to parallel-connected armature windings of a plurality of d-c traction motors, only two of which (15, 16) are identified in FIG. 1. In practice a traction motor is hung on each axle of the locomotive, there are usually two or three axles per truck, and there are two trucks per locomotive. The motors have field windings (not shown) connected in series with their respective armatures during the motoring or propulsion mode of operation. Alternatively, a-c traction motors could be used, in which case suitably controlled electric power inverters would be connected between the respective motors and the d-c bus 14.

Field windings (not shown) on the rotor of the main alternator 12 are connected for energization to the output of a suitable source 17 of regulated excitation current. Preferably the source 17 comprises a 3-phase controlled rectifier bridge the input terminals of which receive alternating voltages from a prime mover-driven auxiliary alternator 18 that can actually comprise an auxiliary set of 3-phase windings on the same frame as the main alternator 12. This source includes conventional means for varying the magnitude of the direct current that it supplies to the alternator field as necessary to minimize any magnitude difference between a control signal on an input line 19 and a feedback signal V representative of the average magnitude of the output voltage of the power rectifier 13. The latter voltage magnitude is a known function of the field current magnitude and also varies with the speed of the prime mover 11.

The prime mover 11 is a thermal or internal-combustion engine or equivalent. On a self-propelled diesel-electric locomotive, the motive power is typically provided by a high-horsepower, turbocharged, 4-stroke, 16-cylinder diesel engine. Such an engine has a number of ancillary systems that are represented by. labeled blocks in FIG. 1. A combustion air system 21 conventionally includes an engine exhaust gas-driven turbocharger for compressing air in the combustion air intake manifold of the engine. A lube oil system 22 conventionally includes an engine crankshaft-driven pump and associated piping for supplying suitable lubricating oil to the various moving parts of the engine. A cooling water system 23 conventionally includes a pump for circulating relatively cool water from a plurality of air-cooled heat exchangers or radiators to a lube oil cooler, to the cylinder liners of the engine for absorbing heat rejected during the combustion process, and also to "intercoolers" through which the combustion air passes after being compressed (and therefore heated) by the turbocharger. These three systems (21-23) are illustrated in more detail in FIG. 2 which will soon be described.

A diesel engine fuel system 24 conventionally includes a fuel tank, fuel pumps and nozzles for injecting fuel oil into the respective power cylinders which are arranged in two rows or banks on opposite sides of the engine, tappet rods cooperating with fuel cams on a pair of camshafts for actuating the respective injectors at the proper times during each full turn of the crankshaft, and a pair of fuel pump racks for controlling how much fuel oil flows into a cylinder each time the associated injector is actuated. The position of each fuel pump rack, and hence the quantity of fuel that is being supplied to the engine, is controlled by an output piston of an engine speed governor system 25 to which both racks are linked. The governor regulates engine speed by automatically displacing the racks, within predetermined limits, in a direction and by an amount that minimizes any difference between actual and desired speeds of the engine crankshaft. The desired speed is set by a variable speed control signal received from a controller 26, which signal is herein called the speed command signal or the speed call signal.

In a normal motoring or propulsion mode of operation, the value of the engine speed call signal provided by the controller 26 is determined by the position of a handle 27 of a manually operated throttle to which the controller is coupled. A locomotive throttle conventionally has eight power positions or notches (N), plus idle and shutdown. N1 corresponds to a minimum desired engine speed (power), while N8 corresponds to maximum speed and full power. In a consist of two or more locomotives, only the lead unit is usually attended, and the controller on board each trail unit will receive, over a trainline 28, an encoded signal that indicates the throttle position selected by the operator in the lead unit.

As was explained hereinbefore, for each power level of the engine there is a corresponding desired load. The controller 26 is suitably arranged to translate the throttle notch information into a control signal of appropriate magnitude on the input line 19 of the alternator field regulator 17, whereby the traction power is regulated to match the called for power so long as the alternator output voltage and load current are both within predetermined limits. For this purpose, and for the purpose of deration (i.e., unloading the engine) and/or limiting engine speed in the event of certain abnormal conditions, it is necessary to supply the controller 26 with information about various operating conditions and parameters of the propulsion system, including the engine and its support systems.

Figure 2:
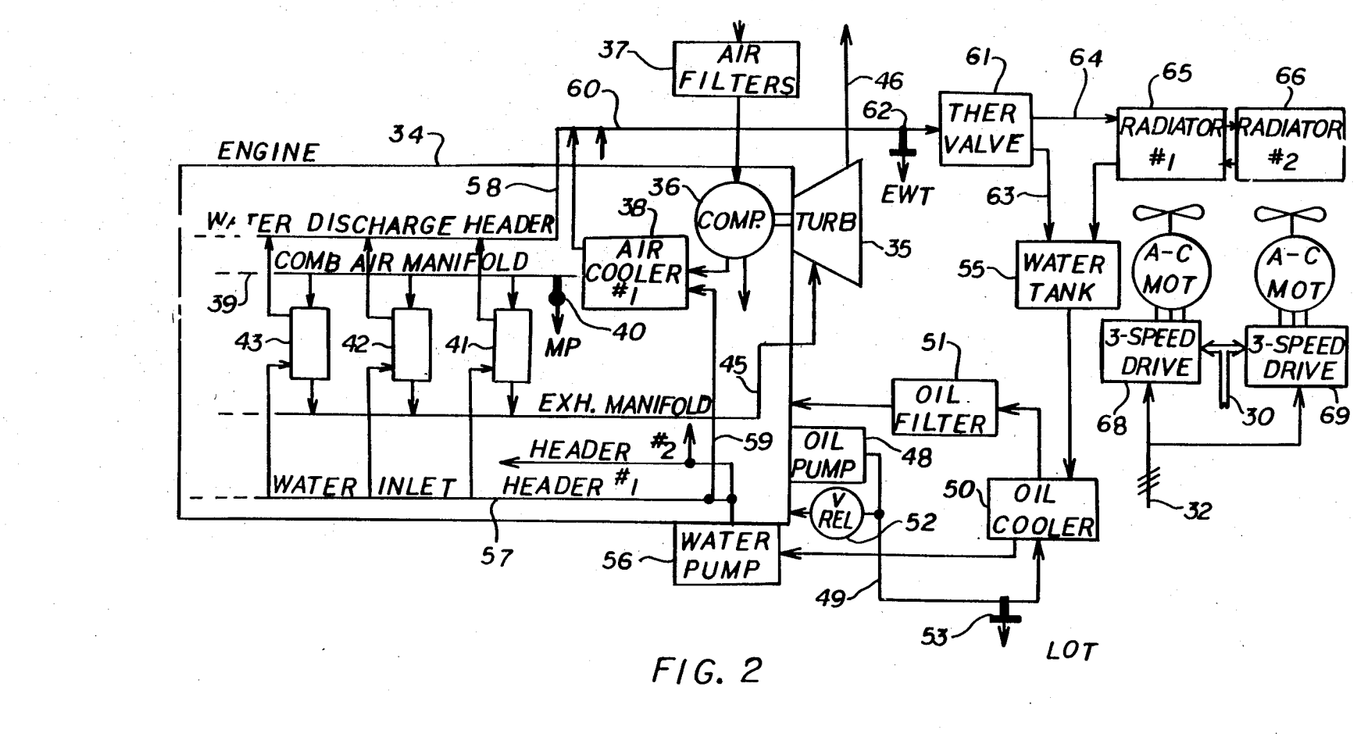
FIG. 2 is a simplified schematic diagram of the locomotive engine and associated support systems that supply it with combustion air, lubricating oil, and cooling water.

More particularly, the controller 26 typically receives the voltage feedback signal V (representative of the average magnitude of the rectified alternator output voltage), current feedback signals I1, I2, etc. (representative, respectively, of the magnitude of current in the armature windings of the individual traction motors), and a load control signal issued by the governor system 25 if the engine cannot develop the power demanded and still maintain the called-for speed. (The load control signal is effective, when issued, to reduce the magnitude of the control signal on the line 19 so as to weaken the alternator field until a new balance point is reached.) In addition, as is illustrated in FIG. 1, the controller is supplied with an engine speed signal RPM indicating the rotational speed of the engine crankshaft, an ambient air pressure signal BP from a barometric pressure sensor 29, a combustion air pressure signal MP from a pressure sensor associated with an air intake manifold of the engine, an oil temperature signal LOT from a temperature sensor on the hot oil side of the lube oil cooler, and a water temperature signal EWT from a temperature sensor in a hot water section of the cooling water system 23. In response to the latter signal, the controller sends encoded speed control signals, via a multiline serial data link or bus 30, to radiator fan motor(s) that are part of auxiliary load equipment 31 connected for energization, via a 3-wire line 32, to the engine-driven auxiliary alternator 18, whereby the flow of air across the heat exchange tubes of the radiators is controlled as a function of water temperature so as to maintain a relatively constant engine operating temperature over the load range of the engine and with wide variations in ambient temperature. FIG. 2 shows the cooling water and combustion air systems in more detail.

In FIG. 2 the diesel engine is represented by the block 34. At one end of the engine, opposite to the alternator end, the turbocharger in the combustion air system is mounted on the engine frame. The turbocharger comprises a gas turbine 35 the output shaft of which drives a centrifugal air compressor 36. Clean air is collected in a plenum, passed through an array of air filters 37, delivered to a central inlet of the compressor 36, and discharged (at elevated pressure and temperature) through alternative peripheral outlets on opposite sides of the engine. The compressed air that is discharged from each of the two outlets passes through an associated air-water heat exchanger (commonly referred to as either an intercooler or an aftercooler) and into a combustion air intake manifold. FIG. 2 shows only one air cooler 38 and one intake manifold 39 on the near side of the engine and does not show the duplicate cooler and the duplicate manifold that are conventionally disposed on the far side. A manifold pressure sensor 40 is connected to the intake manifold 39. From the manifold 39 the compressed air is supplied to a bank of power cylinders on the same side of the engine. While only three cylinders 41, 42, and 43 are shown, in practice each intake manifold supplies combustion air to eight cylinders of a 16-cylinder engine, or six cylinders of a 12-cylinder engine, or four cylinders of an 8-cylinder engine.

The gases produced during combustion are exhausted from each of the cylinders into an exhaust manifold 45. The exhaust gases drive the turbine 35 prior to their discharge through an exhaust stack 46 to the atmosphere. Turbine speed increases as the engine develops more power. With the engine running at or near full power, the compressor 36 is effective to compress the combustion air in the intake manifolds (39) to more than twice atmospheric pressure. The intercoolers (38) are then effective to lower the temperature of the compressed air (which was heated appreciably during the compression process), thereby improving thermal efficiency, reducing fuel consumption, and lowering the thermal loading of the engine.

In the lube oil system that is illustrated in FIG. 2, hot engine lubricating oil from the crankcase near the bottom of the engine 34 is pumped by an engine-driven pump 48 into a pipe 49 connected to the inlet of an oil-water heat exchanger 50, and cooled oil flows from 50 through an oil filter 51 and another pipe to an oil supply header (not shown). From the supply header within the main frame of the engine, the oil is distributed to various bearings, valves, pistons, gears, and other moving parts of the engine for lubricating and/or cooling purposes. A conventional pressure relief valve 52 connects the lube oil pipe 49 to the oil pan, and a temperature sensing device 53 is exposed to the oil flowing in the pipe 49 near the inlet of the oil cooler 50. Preferably the lube oil temperature sensor 53 comprises a conventional thermistor.

As is indicated in FIG. 2, the engine cooling water system comprises a water storage tank 55 from which relatively cool water flows, via heat exchange tubes inside the oil cooler 50, to the suction side of an engine-driven water pump 56. The pump raises the pressure of the water which then flows into a pair of inlet headers on opposite sides of the engine. Water in the first inlet header 57 passes in parallel through the individual cylinder jackets of the bank of cylinders on the near side of the engine to a common water discharge header 58 that is centrally located above the two banks of cylinders. The inlet and discharge headers 57 and 58 are also interconnected by a water branch comprising a pipe 59 and the case of the first combustion air cooler 38. A similar branch enables cooling water to flow from the second inlet header through the second intercooler (not shown) on the far side of the engine. The system is balanced hydraulically so that the flow rate to the two intercoolers is in the desired ratio to the flow rate to the cylinder jackets.

Hot water leaving the engine from the discharge header 58 flows through a pipe 60 to at least one thermostatically controlled bistable fluid valve 61. A temperature sensing device 62 (preferably another thermistor) is exposed to the water flowing in the pipe 60 near the inlet port of the valve 61. The valve 61 has two outlet ports that respectively communicate with two water channels 63 and 64. Whenever the temperature of the water entering the valve is lower than a predetermined threshold, or whenever the water pressure is lower than a predetermined level (i.e., whenever the engine speed is so low that the water pump 56 is unable to raise the water pressure to such a level), all of the water is diverted via the radiator bypass channel 63 to the storage tank 55. Otherwise the water flows into the channel 64 which feeds a bank of two or more water-air heat exchangers or radiators 65 and 66, and after being cooled in these radiators the water is discharged into the tank 55. In practice an additional bank of radiators (not shown), disposed in parallel with the illustrated bank, is connected to a second thermostatically controlled bistable fluid valve whose threshold temperature can differ slightly from that of the first valve 61. The radiators are disposed at a higher elevation than the storage tank 55, and water will quickly and completely drain from them after each cooling cycle. It should be noted here that if and when the radiators 65, 66 are bypassed due to insufficient water pressure (which in turn is due to the engine running at low speed, e.g., under 400 rpm), the water will be cooled while traversing the intercoolers (38) because the combustion air, being only moderately compressed when the turbocharger speed is low (as is true when the engine is lightly loaded) is then cooler than the water. This cooling effect, plus the rejection of heat directly from the engine and its associated cooling water and lube oil systems by radiation and convection, keeps the engine from overheating at low speed.

Cooling air is blown through the radiators by a pair of fans whose blades are respectively driven by two variable speed 3-phase induction motors. Alternating voltages are applied to these fan motors from the respective outputs of a pair of 3-speed motor drive systems 68 and 69. The inputs of both of the latter drives are connected to the line 32 which in turn is energized by the output of an engine-driven auxiliary alternator, whereby the fundamental frequency of the applied voltages (and hence full speed of the fans) tends to vary with engine speed. Each of the drives 68 and 69 is suitably constructed and arranged to reduce this frequency on command so that the associated fan can run at less than full speed. Separate speed commands for the respective drives are provided by the controller 26 (FIG. 1) over the bus 30 in the form of suitably encoded signals that indicate whether full, reduced, or zero speed is desired. Preferably each fan motor drive comprises the improved "cycle-skipping" speed control system that is disclosed and claimed in U.S. Pat. No. 4,461,985 granted on Jul. 24, 1984, to T. D. Stitt and assigned to General Electric Company, and its controls are programmed to provide both half and quarter speed alternatives to full speed.

While the engine cooling system illustrated in FIG. 2 and described above is a pressurized, dry-radiator type that employs water as the working coolant, persons skilled in the art will understand that other types and other fluids could alternatively be used. In any event, the majority (almost 80%) of the total heat absorbed by the cooling system is transferred directly from the engine to the coolant, and the remainder is transferred first to the lube oil and then through the oil cooler 50 to the coolant. The speeds of the two radiator fan motors are suitably changed as a function of the coolant temperature (as detected by the sensor 62) so as to maintain this temperature in a normal range of approximately 180 to 200 degrees Fahrenheit (F) under most conditions.

Figure 3:
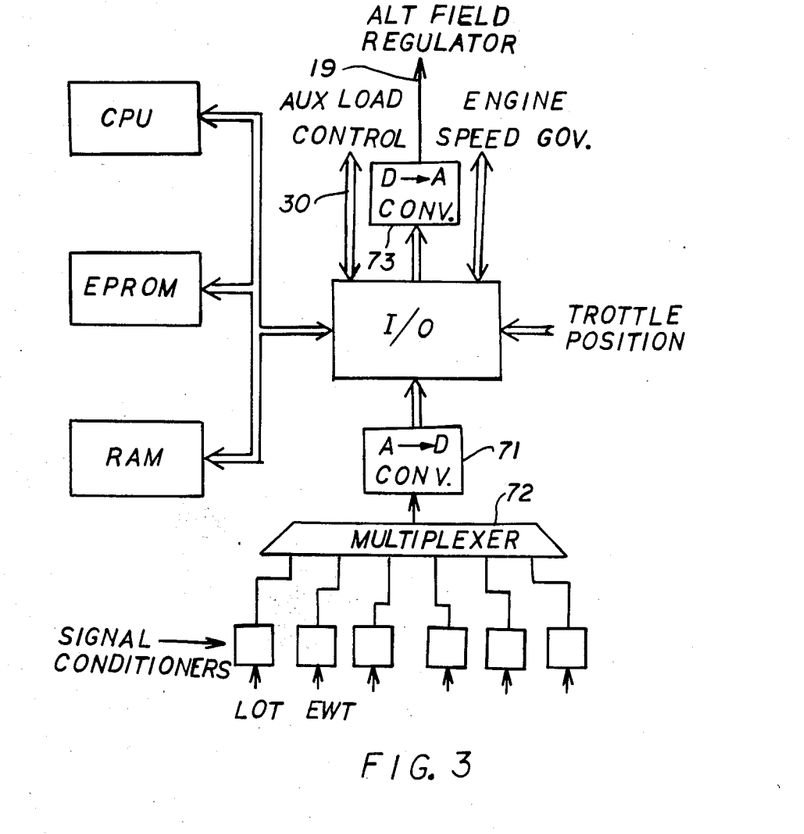
FIG. 3 is an expanded block diagram of the controller (shown as a single block in FIG. 1) which produces output signals for respectively controlling the rotational speed of the engine, the field excitation of the alternator, and the energization of certain auxiliary electrical loads.

In the presently preferred embodiment of the invention, the controller 26 comprises a microcomputer. Persons skilled in the art will understand that a microcomputer is actually a coordinated system of commercially available components and associated electrical circuits and elements that can be programmed to perform a variety of desired functions. In a typical microcomputer, which is illustrated in FIG. 3, a central processing unit (CPU) executes an operating program stored in an erasable and electrically reprogrammable read only memory (EPROM) which also stores tables and data utilized in the program. Contained within the CPU are conventional counters, registers, accumulators, flip flops (flags), etc., along with a precision oscillator which provides a high-frequency clock signal. The microcomputer also includes a random access memory (RAM) into which data may be temporarily stored and from which data may be read at various address locations determined by the program stored in the EPROM. These components are interconnected by appropriate address, data, and control buses. In one practical embodiment of the invention, an Intel 8086 microprocessor is used.

The other blocks shown in FIG. 3 represent conventional peripheral and interface components that interconnect the microcomputer and the external circuits of FIG. 1. More particularly, the block labeled "I/O" is an input/output circuit for supplying the microcomputer with data representative of the selected throttle position and with digital signals representative of the readings of the various voltage, current, speed, pressure, and temperature sensors associated with the locomotive propulsion system. The latter signals are derived from an analog-to-digital converter 71 connected via a conventional multiplexer 72 to a plurality of signal conditioners to which the sensor outputs are respectively applied. The signal conditioners serve the conventional dual purposes of buffering and biasing the analog sensor output signals. As is indicated in FIG. 3, the input/output circuit also interconnects the microcomputer with the auxiliary load controls (via the multiline bus 30), the engine speed governor, and a digital-to-analog signal converter 73 whose output is connected via the line 19 to the alternator field regulator.

The controller 26 is suitably programmed to impose certain temperature-responsive restraints or limits on the engine speed command signal that it provides for the governor system 25. Under normal propulsion conditions the value of this signal varies with the speed selected by the locomotive operator, as indicated by the throttle-position signal that the controller receives over the trainline 28. But when the throttle is set in its idle position, the controller 26 actually calls for an engine speed that is a function of the engine cooling water temperature (EWT). Furthermore, if either the water temperature or the engine lube oil temperature (LOT) rises above a predetermined high magnitude (e.g., 240° F.), the controller calls for idle speed regardless of the throttle position. These functions can be better understood with the aid of FIG. 4 which illustrates that a throttle position indicating signal on an input line 76 is fed to an "idle override" functional block 77. The output of the block 77 is throttle request data. Normally the throttle request is the same as the throttle position. But whenever the throttle position equals "idle" the signal on line 76 is modified by the idle override function, and the throttle request is then determined by the value of the engine coolant temperature indicating signal EWT.

Figure 4:
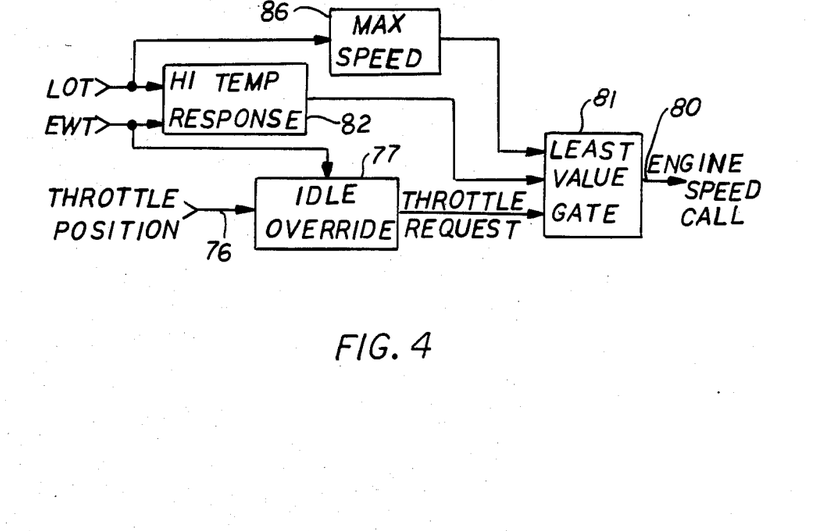
FIG. 4 is a diagram of an "equivalent circuit" that is used to illustrate the manner in which the engine speed command signal is produced by the controller shown in FIG. 3.

As is indicated in FIG. 4, the throttle request from the idle override block 77 is fed to an engine speed call line 80 via an auctioneering functional block 81 labeled "least value gate," where it is compared with two additional inputs so that the actual value of the speed command signal is the same as the input of lowest value. One of the additional inputs to the gate 81 is provided by a functional block 82 labeled "hi temp response." This input has a normally high value, but if either one of the two temperature indicating signals LOT and EWT attains the aforesaid predetermined high magnitude, its value is reduced to a number corresponding to idle speed. The other additional input to the gate 81 is provided by a "maximum speed" functional block 86 which in turn is responsive to the lube oil temperature. The input provided by the block 86 has a high value under normal operating conditions, but its value will be reduced to a number corresponding to a limited engine speed if LOT indicates that the lubricating oil is relatively cool.

Figure 5:
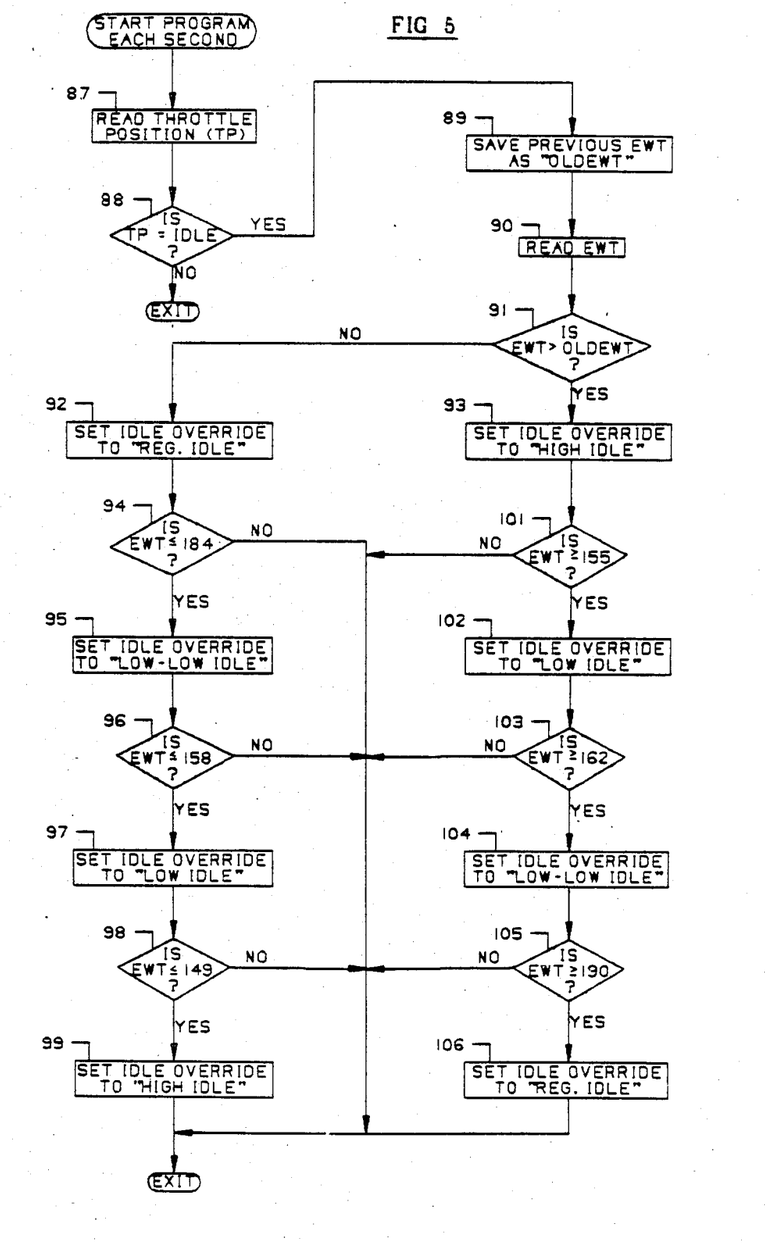
FIG. 5 is a flow chart that explains the operation of the preferred embodiment of the coolant temperature responsive idle override function illustrated in FIG. 4.

In the presently preferred embodiment of the invention, the function performed by the idle override block 77 is implemented by programming the microcomputer to execute the routine that is illustrated in FIG. 5. This routine is repeated 60 times a minute. It starts with a step 87 of reading the signal on the trainline 28 which indicates the position of the throttle handle 27. Upon completing this step, the routine proceeds to an inquiry point 88 which determines whether or not the throttle is in its idle position. If not, the routine exits here. Otherwise, the routine proceeds to a step 89 which loads the previously read magnitude of the temperature signal EWT (which is a measure of the temperature of the coolant in a hot water section of the engine cooling system) into a suitable register where it is saved as "OLDEWT," and then to a step 90 of reading and storing the latest magnitude of EWT. Upon completing step 90, an inquiry is made at point 91 to determine whether or not the new EWT reading is higher than OLDEWT. In response to a negative answer, which indicates that the coolant temperature is not increasing, the next step 92 is to set the throttle request output of the idle override function to a value that corresponds to the regular idle speed of the locomotive engine (e.g., approximately 440 rpm which is the same as notch 1 speed). Alternatively, if the coolant temperature were increasing the next step 93 in the idle override routine would be to set the throttle request to a value corresponding to a predetermined "high idle" speed which is appreciable higher than regular idle speed. Preferably the high idle speed is approximately 535 rpm which is the speed normally commanded when the throttle handle is in notch 2.

If the coolant temperature is not increasing, the FIG. 5 routine proceeds from step 92 to an inquiry point 94 which tests whether or not EWT is equal to or less than a first predetermined magnitude that corresponds, for example, to a coolant temperature of approximately 184° F. If not, the routine exits here and the idle override continues to request regular idle speed. But if EWT is equal to or below this magnitude, step 94 is followed immediately by a step 95 that sets the throttle request to a value corresponding to a predetermined "low-low idle" speed (e.g., approximately 270 rpm), and this is followed by another inquiry 96 which determines whether or not EWT is equal to or less than a second predetermined magnitude that is lower than the aforesaid first magnitude. The second magnitude corresponds, for example, to a coolant temperature of approximately 158° F. So long as EWT is not increasing and is within a range between the aforesaid first and second predetermined magnitudes, the idle override function will request the fuel saving low-low idle speed. On the other hand, if the coolant temperature were no greater than 158° F., the inquiry step 96 of the idle override ( routine would be followed immediately by a step 97 that sets the throttle request to a value corresponding to a predetermined "low idle" speed (e.g., approximately 340 rpm) which is substantially lower than regular idle speed but higher than the low-low idle speed, and then by a third inquiry 98 to determine whether or not EWT is equal to or less than a third predetermined magnitude that is lower than the aforesaid second magnitude. Preferably the third magnitude corresponds to a preset low level of coolant temperature of approximately 149° F.

So long as EWT is not increasing and is within a range between the aforesaid second and third predetermined magnitudes, the idle override function requests low idle speed. But once the coolant temperature equals or falls below the last-mentioned preset low level, the idle override routine proceeds from inquiry point 98 to a final step 99 that sets the throttle request to a value corresponding to the aforesaid high idle (N2) speed. In effect, the input that the least value gate 81 (FIG. 4) receives from the idle override function 77 will now have a value equal to an N2 throttle request. As a result of this increase in idle speed, the engine produces more heat and the coolant warms up, thereby protecting the engine from undesirably low temperature when idling.

Whenever the coolant temperature is increasing, the idle override shown in FIG. 5 will proceed from inquiry point 91 and step 93 to an inquiry point 101 which tests whether or not EWT is equal to or more than a fourth predetermined magnitude that is slightly higher than the aforesaid third magnitude and that corresponds to a predetermined reset level of coolant temperature (e.g., approximately 155° F.). If not, the routine exits here and the idle override continues to request high idle speed. But once EWT equals or exceeds this magnitude, step 101 is followed immediately by a step 102 that returns the throttle request to its low idle value, thereby clearing or resetting the above-described low temperature protective feature of the idle override function. Step 102 is followed by another inquiry 103 which determines whether or not EWT is equal to or more than a fifth predetermined magnitude that is slightly higher than the aforesaid second magnitude. The fifth magnitude corresponds, for example, to a coolant temperature of approximately 162° F. So long as EWT is increasing and is within a range between the aforesaid fourth and fifth predetermined magnitudes, the idle override function requests low idle speed. On the other hand, if the coolant temperature were equal to or above 162° F., the inquiry step 103 of the idle override routine would be followed immediately by a step 104 that sets the throttle request to its low-low idle value and then by a final inquiry 105 to determine whether or not EWT equals or exceeds a sixth predetermined magnitude that is slightly higher than the aforesaid first magnitude. Preferably the sixth magnitude corresponds to a coolant temperature of approximately 190° F.

So long as EWT is increasing and is within a range between the aforesaid fifth and sixth predetermined magnitudes, the override function will request the fuel saving low-low idle speed. But as soon as the coolant temperature equals or rises above 190° F., the idle override routine proceeds from inquiry point 105 to a final step 106 that sets the throttle request to a value corresponding to regular idle speed. In the above-described manner, the idle override function 77 is effective, whenever the throttle handle is set for idle speed, to cause the value of the engine speed command signal on line 80 (FIG. 4) to vary as a function of the coolant temperature. The resulting relationship between the coolant temperature (EWT) and the actual idle speed of the engine (RPM) is shown graphically in FIG. 6.

Figure 6:
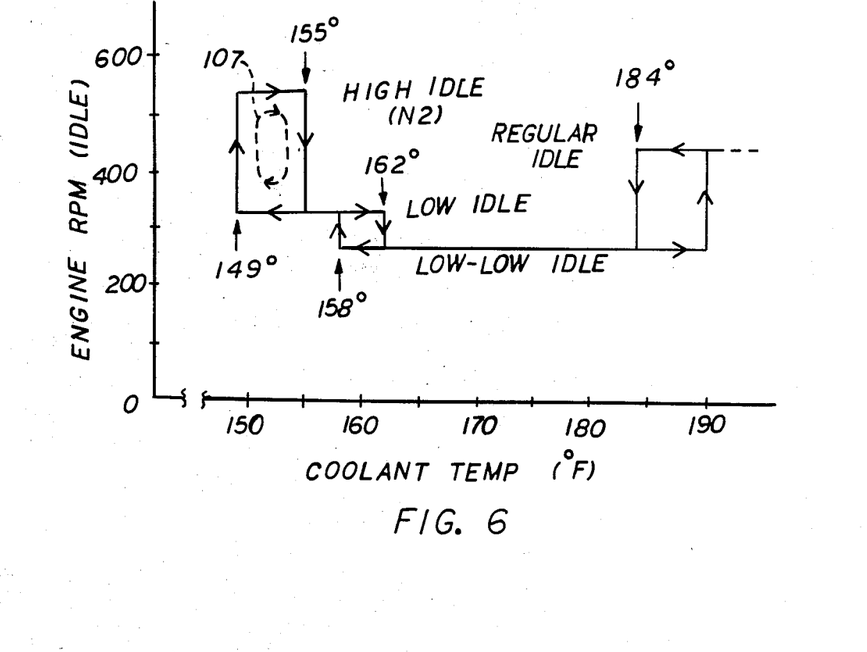
FIG. 6 is showing how the idle speed of the engine is changed by the FIG. 5 program as a function of engine coolant temperature.

In FIG. 6 it will be apparent that low-low idle speed, which is most desirable for fuel conservation, is obtained whenever the temperature is in a warm range between 162° and 184°. If the temperature of the coolant were to drop to 158°, the idle override function would increase the speed of the engine to low idle, whereupon the engine would produce extra heat. If the extra heat were sufficient to cause the coolant temperature to rise to 162°, the engine speed would then be returned to low-low idle. In practice the idle override function can cycle the engine speed between low idle and low-low idle as the coolant temperature alternately drops to 158° and rises to 162°. (While not shown in the drawings, in practice the controller is suitably programmed to override the idle override function and to command a greater idle speed if and as necessary to ensure that the output power of the auxiliary alternator is sufficient to keep the locomotive battery properly charged.)

If the extra heat produced by the engine at low idle speed is insufficient to keep the temperature from falling from 158° to the preset low level of 149°, the idle override function will now respond by increasing engine speed from low idle to high idle (N2). As can be seen in FIG. 6, this is a relatively large speed change. In accordance with the present invention, the last-mentioned speed increase is accompanied by a significant increase in auxiliary load on the engine, whereby. the engine has to develop more torque. The speed and torque increases will cause the engine to produce substantially more heat, and the coolant temperature soon rises to the reset level of 155°, whereupon the engine speed is returned to low idle and the auxiliary load is returned to normal. In practice, once the temperature falls to 149° and assuming no appreciable change in throttle position, ambient air temperature or other external conditions, the speed of the engine and the temperature of the coolant will repeatedly rise and fall around the loop shown by the reference number 107 in FIG. 6, with relatively little time spent in high idle.

Figures 7, 8, 9:
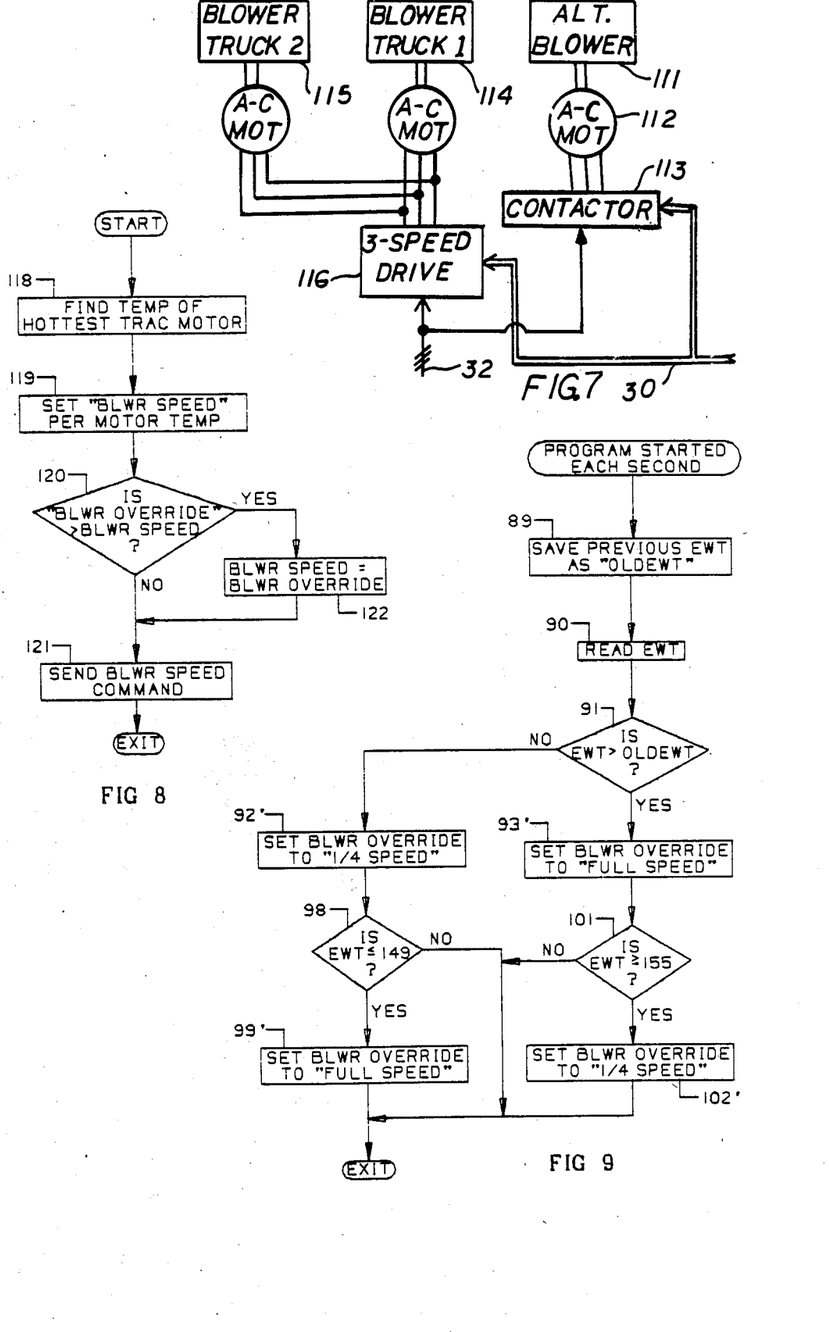
FIG. 7 is an expanded schematic diagram of several blowers that are part of the auxiliary load equipment represented by a single block in FIG. 1.
FIGS. 8 and 9 are flow charts explaining the operation of the preferred embodiment of a coolant temperature responsive blower motor speed function that is implemented by the FIG. 3 controller.

The auxiliary load increasing function of the present invention will now be described with reference to FIG. 7-9. FIG. 7 shows blower equipment for supplying cooling air to the traction alternator and traction motors, respectively. The alternator blower is represented by the block 111. Its impeller is driven by a 3-phase induction motor 112 which is connected via a suitable contactor 113 to the line 32. The contactor 113 is selectively closed or opened on command from the controller 26 (FIGS. 1 and 3) to which it is coupled by the bus 30. When the contactor is closed, the blower motor 112 is energized by the output of an engine-driven auxiliary alternator to which the line 32 is connected, whereby the fundamental frequency of the alternating voltage applied to the motor (and hence the full speed of the blower 111) tends to vary with engine speed.

As is indicated in FIG. 7, a pair of blowers 114 and 115 is provided for cooling the traction motors that are respectively located on the first and second trucks of the locomotive. The impellers of these two blowers are respectively driven by two variable speed 3-phase induction motors. Alternating voltages are applied to both of these motors from the output of a 3-speed motor drive system 116 which in turn is connected to the line 32. The drive 116 is basically the same as the previously described radiator fan motor drives 68 and 69 (FIG. 2). It can reduce the fundamental frequency and amplitude of the voltages applied to the two traction motor blower motors on command, whereby the rotational speed of both blowers can be changed from full speed to a predetermined fraction of full speed. The drive 116 receives a speed command signal over the bus 30 in the form of suitably encoded signals that indicate whether full, reduced, or zero speed is desired. The desired blower speed is determined by the controller 26 which, in the presently preferred embodiment of the invention, is programmed to execute the traction motor blower speed control routine that is illustrated in FIG. 8.

The first step 118 in the FIG. 8 routine is to find the temperature of the hottest one of the traction motors 15, 16, etc. (FIG. 1). This could be done either by direct temperature sensing or by calculating the temperature based on the sensed values of more easily measured parameters (such as motor speed and armature current) and on certain data stored in the microcontroller memory. The latter approach has practical advantages and is therefore preferred. Having calculated motor temperature, the routine proceeds from step 118 to a step 119 which loads a normally desired blower speed value into a "blower speed" register. This normally desired value is determined by. the traction motor temperature. In order to satisfy. the cooling needs of the traction motors, it increases with temperature. After performing step 119, the FIG. 8 routine proceeds to an inquiry point 120 which tests whether or not a "blower override" value exceeds the normally desired value that was saved in the blower speed register. The blower override value is determined by another routine that will soon be described (see FIG. 9). If the answer to the inquiry 120 is negative, the next step 121 is to send the value in the blower speed register as a speed command signal to the 3-speed blower motor drive system 116 via the serial data link or bus 30. Otherwise, the routine proceeds from point 120 to a step 122 which replaces the normally desired value in the blower speed register with the higher blower override value, and the latter value is then sent by step 121 as the actual speed command to the traction motor blower drive 116.

FIG. 9 illustrates the preferred routine that is executed by the controller 26 to implement the blower motor speed override function of the present invention. This routine is repeated 60 times a minute. Its first three steps are the same as the steps 89, 90 and 91 that are performed in the above-described idle override routine (FIG. 5). If the answer to the inquiry 91 is negative, which indicates that the engine coolant temperature (EWT) is not increasing, the next step 92' is to set the blower override to a value that corresponds to quarter speed operation of the blower motor drive. (Quarter speed is the default speed of the traction motor blowers). From step 92' the FIG. 9 routine proceeds to the inquiry point 98 which determines whether or not EWT is equal to or less than the magnitude that corresponds to the aforesaid preset low level of coolant temperature (e.g., 149° F). If not, the routine exits here. Once the coolant temperature falls to its preset low level, the FIG. 9 routine proceeds from the inquiry point 98 to a final step 99' that automatically sets the blower override to a value corresponding to full blower speed. As a result, the latter value is loaded into the blower speed register at step 122 of the blower motor speed control routine shown in FIG. 8 (unless the normally desired value that was loaded into this register at the earlier step 119 already corresponds to full speed), and the traction motor blowers will be commanded to run at full speed regardless of traction motor temperature. By increasing the speed of the traction motor blowers, the amount of electric power that the auxiliary alternator delivers to these motors is significantly increased. The added auxiliary load on the engine contributes to the production of more heat by the engine as previously explained. For additional loading, the controller can also be arranged to respond to an affirmative answer at inquiry 98 by sending an overriding full-speed command to the pair of 3-speed drives 68 and 69 for the radiator fan motors which normally are turned off when the coolant temperature is below 184° F.

An affirmative answer to the inquiry 91 in the blower speed override routine shown in FIG. 9 indicates that the engine coolant temperature is increasing. In this case the routine proceeds from point 91 to a step 93' which sets the blower override to its full-speed value. The next step 101 is to test whether or not EWT is equal to or more than the magnitude that corresponds to the aforesaid reset level of coolant temperature (e.g., 155°

F.). If not, the FIG. 9 routine exits here and the blower override value continues to command full speed operation of the traction motor blower drive. But once EWT equals or exceeds this magnitude, step 101 is followed immediately by a step 102' that returns the blower override to its quarter-speed value which is too low to replace the normally desired value in the blower speed register of the FIG. 8 routine. At the same time, the controller will replace the temporary full-speed command (if used) with the normal zero-speed command for the radiator fan motor drives 68 and 69. This clears or resets the above-described auxiliary load increasing function.

In summary, the blower motor speed override routine illustrated in FIG. 9 behaves the same as bistable means having a first state in which the override value is low (=quarter speed) and therefore ineffective to increase the amount of electric power that the auxiliary alternator delivers to the auxiliary load, and a second state in which the override value is high (=full speed) and such an increase is therefore effected. The bistable means is controlled by the temperature of the engine coolant: it automatically changes from first to second states in response to the temperature falling to the preset low level, and it automatically returns from second to first states in response to the temperature rising to the predetermined reset level While a preferred embodiment of the invention has been shown and described by way of example, many modifications will undoubtedly occur to persons skilled in the art. The concluding claims are therefore intended to cover all such modifications as fall within the true spirit and scope of the invention.

We claim:

1. In combination with a variable-speed thermal prime mover, a cooling system for supplying a coolant to the prime mover, main and auxiliary electric power generating means mechanically driven by the prime mover, a main load supplied with electric current from the main generating means, an auxiliary load comprising a plurality of variable-speed, motor driven fans and blowers for supplying cooling air to the cooling system, the generating means and the main load, respectively, the fan and blower driving motors being selectively connected for energization to the output of the auxiliary generating means, a controller, means including the controller for regulating the power output of the main generating means, and means including the controller for selecting and controlling the particular fan and blower motors to be energized as required for cooling the prime mover, the generating means and the main load, respectively, the improvement comprising:
   a. means for sensing the temperature of the coolant; and
   b. auxiliary load increasing means associated with the controller and connected to said temperature sensing means for automatically increasing the amount of electric power that the auxiliary generating means delivers to the fan and blower motors in response to the coolant temperature falling to a preset low level.

2. The improvement as in claim 1 for a combination wherein the main load comprises a plurality of traction motors and the means for selecting and controlling the fan and blower motors includes means for changing the rotational speed of the traction motor blowers in accordance with a blower motor speed command the normally desired value of which is determined by the temperature of the hottest traction motor, in which said auxiliary load increasing means is effective to override the normally desired speed command and to cause said speed command to have a full-speed value, regardless of traction motor temperature, if the coolant temperature is equal to or below said preset low level and the normally desired speed command is less than said full-speed value.

3. The improvement as in claim 2, in which said auxiliary load increasing means is additionally effective, if the coolant temperature is equal to or below said preset low level, to cause the motor that drives the blower that supplies cooling air to the generating means to be energized by the auxiliary generating means regardless of the cooling needs of the generating means.

4. The improvement as in claim 2, in which said auxiliary load increasing means is ineffective to override the normally desired blower motor speed command whenever the coolant temperature equals or exceeds a predetermined reset level that is higher than said preset low level.

5. The improvement as in claim 1, in which said auxiliary load increasing means is bistable, having a first state in which it is ineffective to increase the amount of electric power delivered to the auxiliary load and a second state in which such increase is effected, said auxiliary load increasing means automatically changing from first to second states in response to the coolant temperature falling to said preset low level.

6. The improvement as in claim 5, in which said auxiliary load increasing means automatically changes from second to first states in response to the coolant temperature rising to a predetermined reset level that is higher than said preset low level.

7. The improvement as in claim 1 for a combination including means for regulating the operating speed of the prime mover in response to a variable command signal provided by the controller, the controller being so arranged that the value of the speed command signal is normally determined by associated throttle means which has an idle speed setting and multiple power settings, in which the improvement further comprises idle override means associated with the controller and connected to the throttle means and to said temperature sensing means, said idle override means being effective whenever the throttle means is set for idle speed to cause the value of the prime mover speed command signal to vary as a predetermined function of the coolant temperature.

8. The improvement as in claim 7, in which said idle override means is effective, if the coolant temperature is below said preset low level, to maintain said speed command signal at a predetermined value that corresponds to a prime mover speed appreciably higher than regular idle speed if the coolant temperature is equal to or below said preset low level.

9. The improvement as in claim 8, in which said idle override means is so arranged as to reduce said speed command signal to a value lower than its regular idle value in response to the coolant temperature rising to a predetermined reset level that is higher than said preset low level.

10. The improvement as in claim 9, in which said idle override means is further arranged so that said speed command signal increases to its regular idle value in response to the coolant temperature rising to another predetermined level that is higher than said reset level.

11. The improvement of claim 1 for a combination wherein the prime mover is a turbocharged diesel engine.

12. The improvement of claim 11 for a combination wherein the main load comprises a plurality of locomotive traction motors.

* * * * *